US 6,705,167 B2

(12) United States Patent
Kvisteroey et al.

(10) Patent No.: US 6,705,167 B2
(45) Date of Patent: Mar. 16, 2004

(54) ACCELEROMETER

(75) Inventors: Terje Kvisteroey, Horten (NO); Asgeir Nord, Taarnaasen (NO); Ralph Berstein, Oslo (NO); Sigurd Moe, Oslo (NO); Paul Skulstad, Oslo (NO); Kai Viggo Munch, Oslo (NO); Norman Goalby, Wales (GB)

(73) Assignee: SensoNor asa, Horten (NO)

( * ) Notice: Subject to any disclaimer, the term of this patent is extended or adjusted under 35 U.S.C. 154(b) by 0 days.

(21) Appl. No.: 09/863,665

(22) Filed: May 22, 2001

(65) Prior Publication Data

US 2002/0002864 A1 Jan. 10, 2002

(30) Foreign Application Priority Data

Jul. 10, 2000 (EP) ................................. 00305807

(51) Int. Cl.$^7$ ................................. G01P 15/00
(52) U.S. Cl. ................ 73/514.38; 73/514.33; 73/514.34
(58) Field of Search ............ 73/514.38, 514.32, 73/514.33, 514.34, 514.12, 514.13, 514.17, 514.21, 514.24

(56) References Cited

U.S. PATENT DOCUMENTS

| 3,717,036 A | * | 2/1973 | LaCoste ........................ 73/382 |
| 4,398,417 A | * | 8/1983 | Shutt ........................ 73/514.38 |
| 4,872,342 A | * | 10/1989 | Hanson et al. ............ 73/514.29 |
| 5,594,170 A | * | 1/1997 | Peters ........................ 73/514.29 |
| 5,755,978 A | * | 5/1998 | Newell et al. ................. 216/33 |

* cited by examiner

Primary Examiner—Richard A. Moller
(74) Attorney, Agent, or Firm—Boyle, Fredrickson, Newholm, Stein & Gratz, S.C.

(57) ABSTRACT

An accelerometer comprises a housing including a mass-supporting frame and a mass supported on the frame by a pair of outer spring member aligned along a first axis. The mass may comprise an outer mass connected to the pair of outer spring members and an inner mass connected to the outer mass by a number of inner spring members, the inner spring members aligned along one or more axes, which form a plane which the axis of the outer spring members also may be aligned. Also provided is means for detecting rotation of the mass and translation of the inner mass.

23 Claims, 6 Drawing Sheets

Cross-section along line A – A

ACCELEROMETER

BACKGROUND OF THE INVENTION

1. Field of the Invention

This invention relates to an accelerometer capable of measuring acceleration along two axes.

2. Description of the Related Art

Accelerometers are well known in the art, and are used in many applications, such as aeronautic and automotive applications, in order to detect rapid acceleration or deceleration. One example of an application of an accelerometer is that of air bag deployment in automobiles.

As control systems have become more sophisticated it has become desirable to detect acceleration/deceleration in more than one direction so that control of, for example, an air bag, can be adapted dependent upon the direction of acceleration/deceleration. This is difficult to achieve, however. One approach is simply to provide two accelerometers one for each of the two axes of interest. Accurate alignment is difficult, however, and the resulting device is bulky and expensive. An alternative is to attempt to fabricate a device which has acceleration/deceleration sensitivity in two directions. Such devices, are, however, difficult to manufacture, and tend to have cross-axis sensitivity, such that acceleration along one axis affects the output indicative of acceleration in the other axis, resulting in erroneous readings. Furthermore, with such devices it is often difficult to alter the sensitivity along one axis without altering that of the other axis.

BRIEF SUMMARY OF THE INVENTION

The present invention seeks to provide an accelerometer which is capable of detection of acceleration along two axes, and which is compact yet simple to manufacture. Furthermore, the present invention seeks to provide an accelerometer which has minimal cross-axis sensitivity.

According to the present invention there is provided an accelerometer comprising:

a housing including a mass-supporting frame; and a mass supported on the frame;

support means for supporting the mass on the frame;

means for detecting rotation of the mass with respect to at least part of the support means; and means for detecting translation of the mass with respect to at least part of the support means.

The mass may comprise an outer mass connected to a pair of outer spring members connected to the frame and an inner mass connected to the outer mass by one or more inner spring members. The spring members in this case form the support means. The axes of the one of more inner spring members may define a plane with which the axis of the outer spring members also may be aligned. In this case, the means for detecting torsional stress may consist of means for detecting torsion stress induced in the outer spring members during acceleration of the accelerometer in a direction which has a component perpendicular to the first axis in the plane of the inner and outer spring members; and the means for detecting translation may consist of means for detecting bending stress in the inner spring members during acceleration of the accelerometer in a direction perpendicular to the plane of the spring members.

Preferably in this case there will be two pairs of inner spring members, and the axis through one pair of the inner spring members will be perpendicular to the axis through the other pair. The inner mass is supported by these two pairs of inner spring members. The axis of the inner spring members and the axis of the outer spring members may be at substantially 45° to one another. Said axes define a plane.

Preferably, the accelerometer is formed from semiconductor material and may be a material with anisotropic properties; preferably silicon.

By employing torsional stress for one direction of detection and bending stress for the other it is possible to minimise cross-axis sensitivity. Preferably the means for determining torsional stress in the support means is positioned in an area on one or more of the outer spring members which is substantially half way between the supporting frame and the mass. Preferably, the means for determining the bending stress in the support means is positioned either on one or both of a pairs of inner spring members adjacent to an inner or outer parting of the mass.

Preferably, the device is formed from silicon and the means for determining the torsional stress may comprise a Wheatstone bridge formed from four piezoresistors, each of the piezoresistors arranged on the support means substantially along a (110) crystal axis in silicon.

The device may be formed from silicon and the means for determining bending stress may comprise two piezoresistors on each of the inner spring members, one at each end of each spring member, or alternatively, may comprise a piezoresistor at one end of each inner spring member, if at least two pairs of inner spring members are provided. All piezoresistors on the inner spring members are preferably but not necessarily aligned parallel to each other and along a <110> crystal axis silicon.

By providing an inner mass and an outer mass it is possible to alter the sensitivity to acceleration in the in-plane direction simply by altering the outer mass, leaving the sensitivity in the other axis unaltered. Furthermore, by changing the ratio of outer mass to inner mass, without, altering total mass, the sensitivity in one direction is unchanged whilst that in the other direction is changed. This leads to considerable design flexibility.

By arranging for the outer spring members and inner spring members to be offset by an angle of substantially 45° it is possible for the device to take advantage of the variation in the piezoresistive coefficient of a semiconductor material of cubic symmetry such as silicon with respect to alignment of the crystal planes of the semiconductor from which the accelerometer is formed. This minimizes the cross-axis sensitivity of the device.

BRIEF DESCRIPTION OF THE DRAWINGS

One example of the present invention will now be described with reference to the accompanying drawings in which.

DETAILED DESCRIPTION OF THE INVENTION

Figure 1:
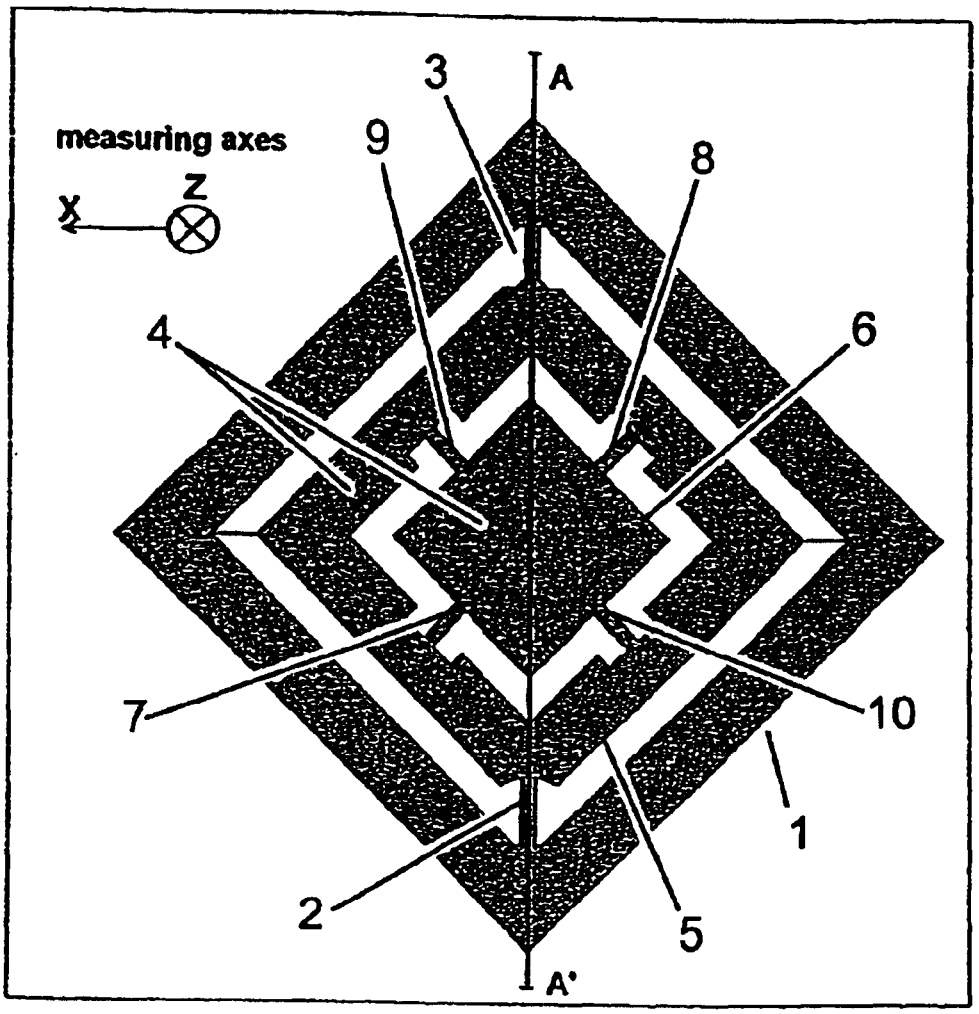
FIG. 1 is a plan view of an accelerometer according to the present invention.

Referring to FIG. 1, an accelerometer according to the present invention is capable of measuring acceleration/deceleration along two axes, X,Z, as shown. The accelerometer comprises an outer housing which forms a mass support frame 1. Attached to the frame 1 are a pair of outer spring members 2, 3, which are aligned along an axis perpendicular to the first measuring axis X. The outer spring members 2, 3 support a mass 4 which comprises an outer mass 5 and an inner mass 6. The inner mass 6 is supported on the outer mass 5 by two pairs of inner spring members 7, 8 and 9, 10. Both pairs of inner spring members 7, 8 and 9, 10 are perpendicular to one another, in a plane which also includes the axis along which the outer spring members 2, 3 are aligned, and at an angle substantially 45° thereto. The accelerometer is etched from a crystalline semiconductor material, in this example silicon, such that a crystalline axis is parallel to the axis of alignment of one of the pairs of inner spring members 7, 8 and 9, 10. The significance of this will be discussed below.

Figure 2:
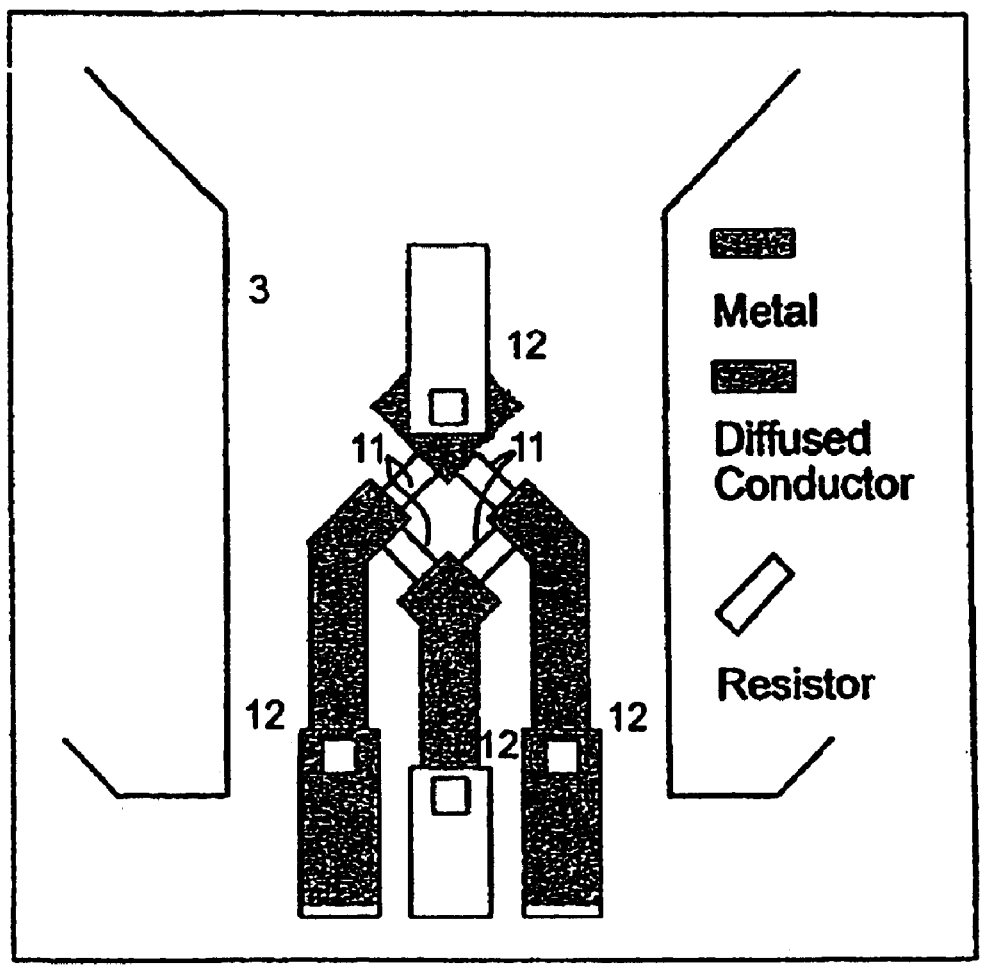
FIG. 2 is a plan view of an outer spring member with associated torsion stress detection means.

As can be seen from FIG. 1, one of the pairs of outer spring members 2, 3 is longer than the other in order to maximize the torsion stress on the spring member where the piezoresistors are located. In this example a torsion stress detection arrangement is positioned on the shorter of the two outer spring members 3. As can be seen from FIG. 2, the torsion stress detection arrangement comprises four piezoresistors 11 arranged in Wheatstone bridge configuration with electric connection 12 to an external detection circuit. The piezoresistors 11 are aligned at substantially 45° to the axis of the outer spring member 3 and are positioned in the centre of the outer spring member 3 to optimise torsional stress detection. In principle the detection could be on both spring members, but for maximum sensitivity this arrangement is selected. When the accelerometer is accelerated or decelerated in the direction of the measuring axis X or mass 4 rotates around the axis of alignment of the outer spring members 2, 3, torsional stress is created that can be detected by the output of the Wheatstone bridge arrangement. It will be noted that the centre of gravity of the mass 4 is below the axis to create torsion effects from linear accelerations. The sensitivity of the accelerometer can be controlled by controlling the width and length of the two outer spring members 2, 3, the overall magnitude of the mass 4 and also the distance between the centre of gravity of the mass 4 and the axis of rotation (A–A').

Figure 3:
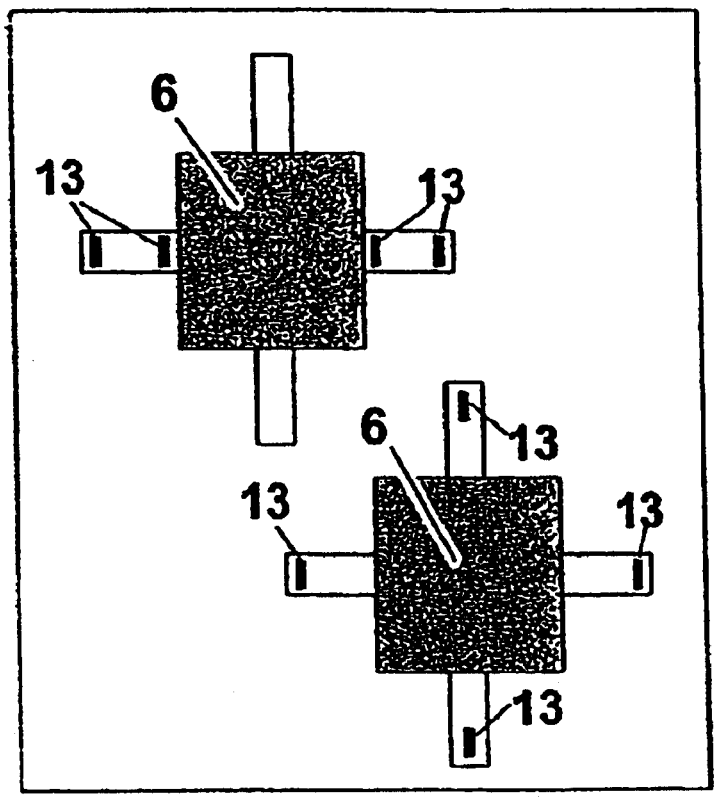
FIG. 3 is a plan view of two examples of inner mass that may be employed in the example of FIG. 1, with associated inner spring members and bending stress detection means.

As mentioned above, the mass 4 comprises an outer mass 5 and an inner mass 6 connected thereto. In this example the outer mass 5 is connected to the inner mass 6 by two pairs of inner spring members 7, 8 and 9, 10, as discussed previously. FIG. 3 shows the positioning of two possible bending stress detection mechanisms for detecting the bending stress that occurs in the inner spring members 7, 8, 9, 10 upon acceleration/deceleration of the accelerometer in the direction of the second measuring axis Z. In the first example, piezoresistors 13 are positioned at either end of each inner spring member of one or other of the two pairs of spring members 7, 8 and 9, 10. In the second example, piezoresistors 13 are placed at one end of each of the inner spring members 7, 8, 9, 10. It will be clear to a person skilled in the art that the piezoresistors also can be placed otherwise. Preferably, each piezoresistor 13 is arranged to form a Wheatstone bridge arrangement, the output of which can be used to detect bending stress, and hence the acceleration in the second measuring axis Z. The sensitivity of the accelerometer along axis Z can be varied for example by varying the magnitude of the inner mass 6 and the dimensions of the inner spring members 7, 8, 9, 10. If the magnitude of the inner mass 6 is increased, the magnitude of the outer mass 5 can be decreased to maintain the same level of sensitivity in the direction of the first measuring axis X.

Figure 4:
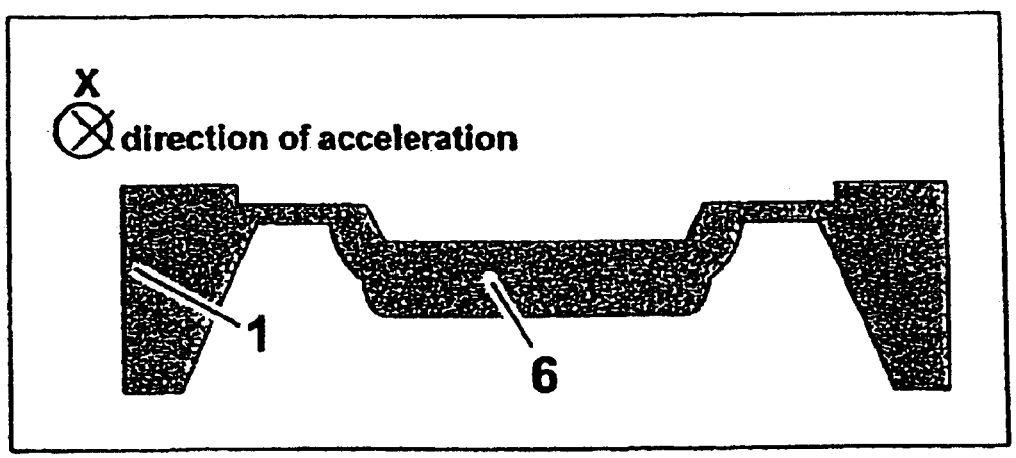
FIG. 4 is a cross-sectional side view of the example of FIG. 1. (A–A')

FIG. 4 is a cross-sectional view of key components of the example of FIG. 1 (A–A'). As can be seen from FIG. 4, the mass 4 has recessed areas formed on one or both surfaces thereof. In use the accelerometer of the invention is arranged so that the mass 4 is surrounded by a fluid or gas, the fluid or gas acting to damp any oscillation of the mass 4. In order to control the damping level, the gap between the mass and the upper casing (not shown) must be very well controlled. If the casing is fabricated from a material which allows precise machining, for example silicon, then recess areas can be formed in the casing to control the damping. If, however, the upper casing is fabricated from non-crystalline material such as glass, which is difficult to etch precisely and/or align with other components, as is the case for the present invention, it is possible to create a recess on the upper surface of the mass 4. The amount of damping can be controlled by controlling the amount of fluid or gas between the upper casing and the upper surface of the mass 4. This is possible without affecting the characteristics of the outer spring members 2, 3, or the inner spring members 7, 8, 9, 10. The recess of the mass 4 also increases the length of the lever for the rotational movement, hence increasing the sensitivity in the X-direction.

Figure 5:
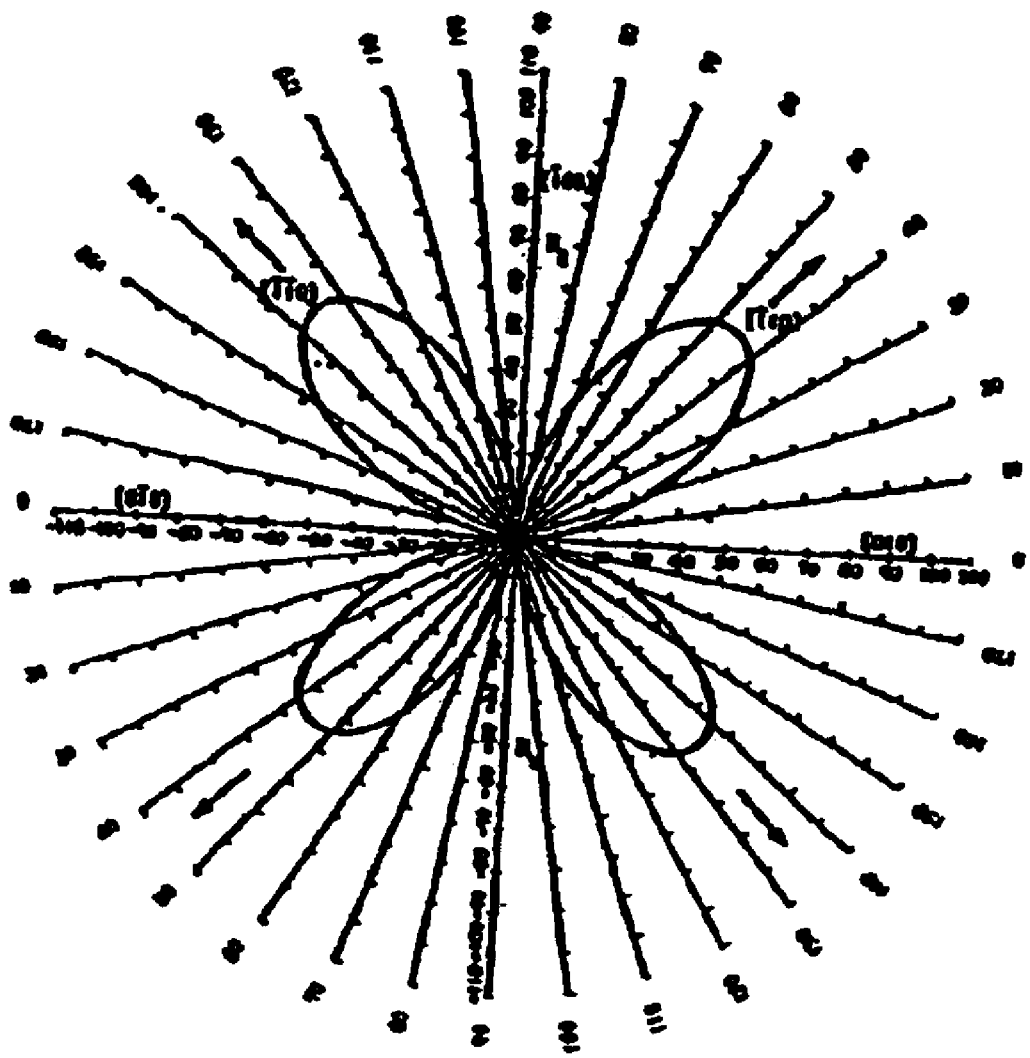
FIG. 5 is a graph showing the dependence of piezoresistive coefficients on crystal alignment for silicon.

FIG. 5 is a graph showing the variation in piezoresistive coefficient of crystalline silicon with respect to the angle of orientation of the crystalline structure. From this it can be seen that the coefficient varies from nearly zero to a maximum when the alignment is varied by 45°. This effect is employed by the present invention. The nature of piezoresistive coefficient variation with crystal orientation near the maxima ensures that piezoresistive detection elements have an acceptable tolerance with respect to misalignment. The orientation of the piezoresistive detection elements on the outer spring members is chosen such, that the susceptibility of the outer detection means to produce an output under bending stress is minimised. The mass consists of an inner and an outer mass. In the preferred embodiment the inner springs contain means for measuring bending stress arising during acceleration in the Z-direction, and the outer springs contain means for measuring torsional stress arising during acceleration in the X-direction. It is obviously possible to alter the functioning of the inner and outer mass. The inner springs would then contain means to measure torsion stress and the outer springs would contain means for measuring bending stress.

In the above example, the detection of acceleration in the X-direction is effectively caused by the inner and outer mass acting in combination. The detection of acceleration in the Z-direction is caused by the inner mass acting alone. Using in this sense the inner mass "twice" reduces the area of silicon required for realisation of the accelerometer.

Figure 6:
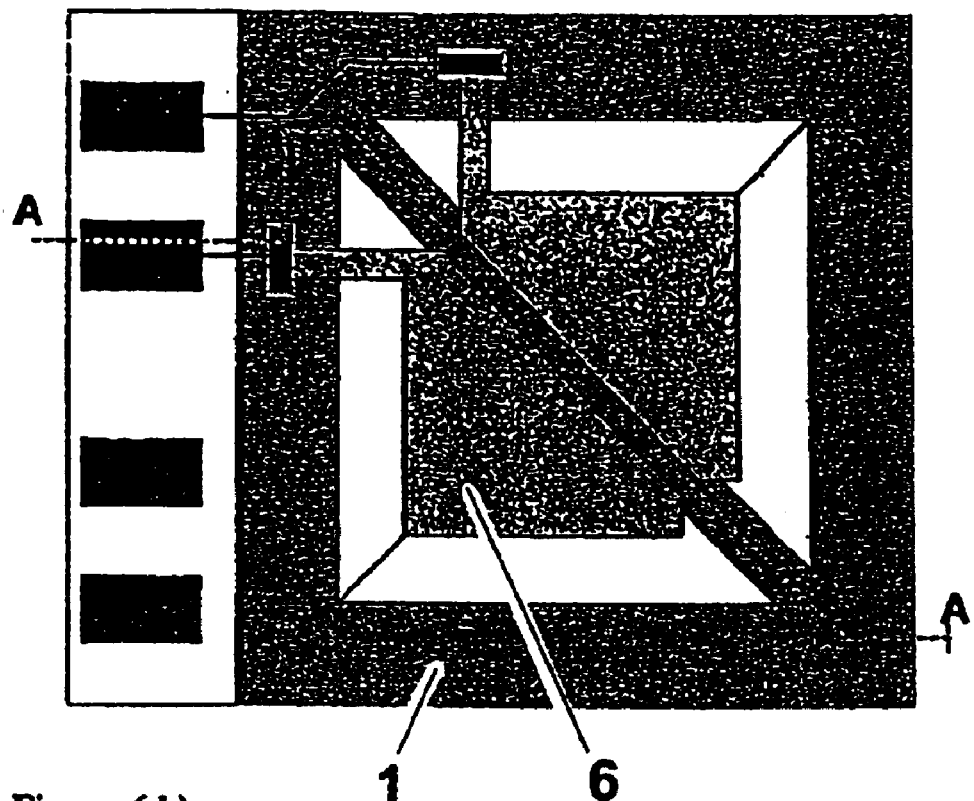
FIG. 6 is a cross-sectional side view of a second example of the invention.
Figure 6:
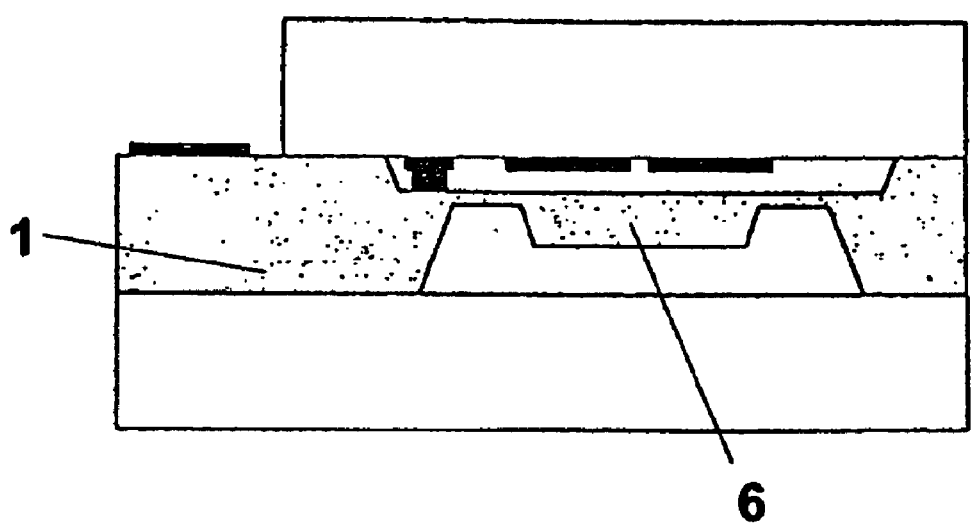

FIG. 6 is a view of a second example of the invention using capacitive detection.

Figure 7:
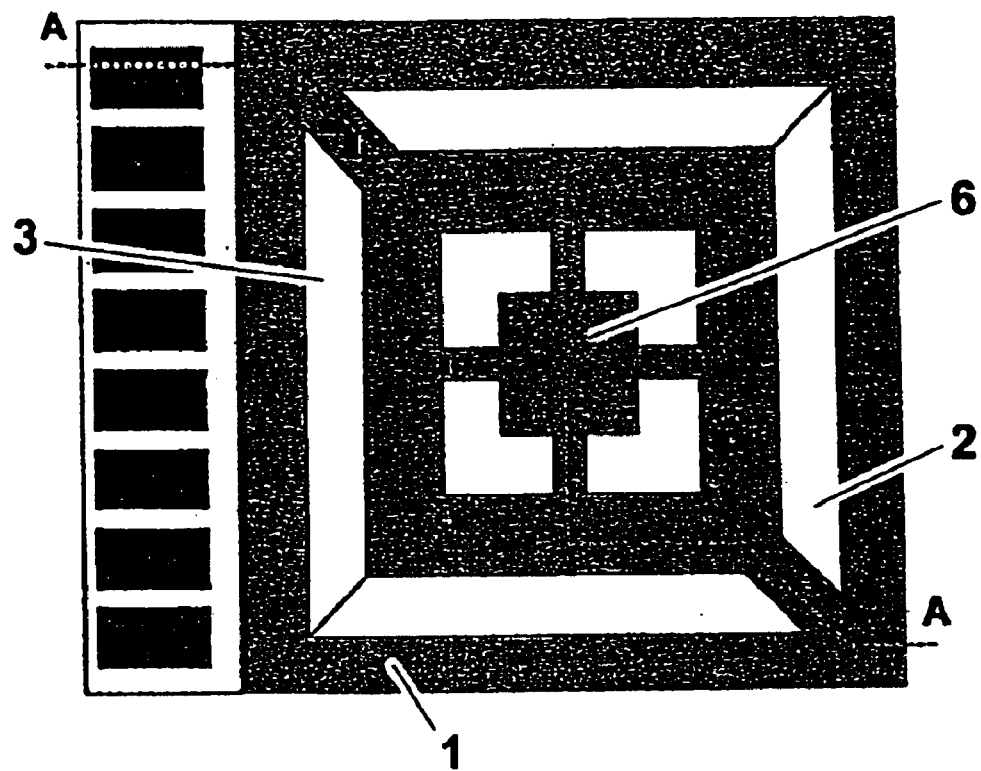
FIG. 7 is a cross sectional side view of a third example of the invention.
Figure 7:
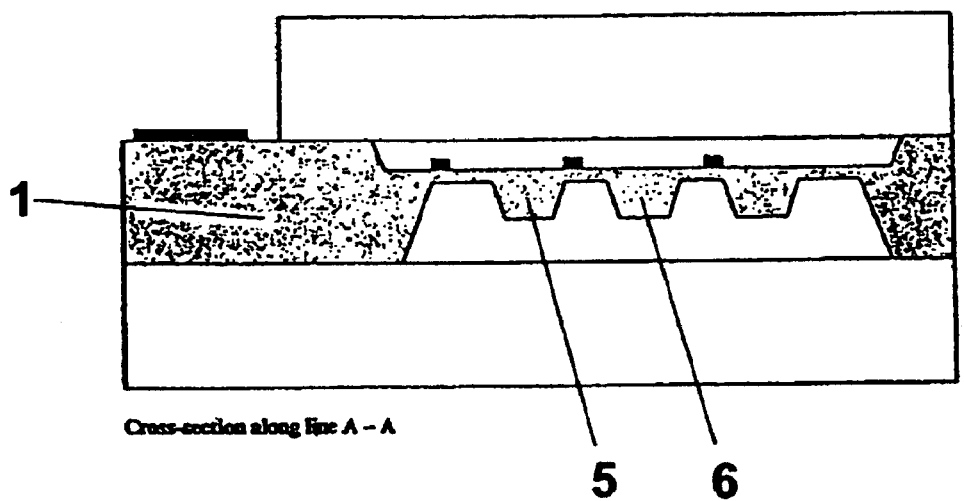

FIG. 7 is a view of a third example of the invention using piezoelectric detection.

It will be appreciated that further alternative detection methods to detect the movement of mass 4, or of the outer mass 5 and inner mass 6 separately, in independent directions can be envisaged.

What is claimed is:

1. An accelerometer comprising:
   a housing including a mass-supporting frame;
   a mass supported on the frame;
   support means for supporting the mass on the frame;
   a first means for detecting rotation of the mass about a first axis with respect to the support means and;
   second, separate means for detecting translation of the mass along a second axis with respect to the support means, wherein the first axis and the second axis are substantially perpendicular to one another.

2. An accelerometer according to claim 1, formed from semiconductor material.

3. An accelerometer according to claim 1, formed from a material having anistropic properties.

4. An accelerometer according to claim 1, formed from a material having piezoresistive properties.

5. An accelerometer according to claim 1, formed from silicon.

6. An accelerometer comprising:
   a housing including a mass-supporting frame;
   a mass supported on the frame;
   support means for supporting the mass on the frame;
   means for detecting rotation of the mass with respect to the support means;
   means for detecting translation of the mass with respect to the support means; and
   an upper casing separated from the mass by a gap, wherein a fluid or gas is located in the gap between the upper casing and the mass to provide mechanical damping, wherein the mechanical damping is controlled by forming a recess in the upper casing.

7. An accelerometer comprising:
   a housing including a mass-supporting frame; and
   a mass supported on the frame, wherein the mass is supported on the frame by a pair of outer spring members aligned along a first support axis, the mass comprising an outer mass connected to the pair of outer spring members and an inner mass connected to the outer mass by a number of inner spring members, the inner spring members aligned along one or more axes which form a plane with which the first support axis is aligned;
   means for detecting rotation of the mass with respect to the support means about the first support axis; and
   means for detecting translation of the mass with respect to the support means in the direction of the second axis.

8. An accelerometer according to claim 7, wherein the means for detecting rotation of the mass comprises means for detecting stress induced by torsion in the outer spring members during acceleration of the accelerometer in a direction in the plane of the inner spring members; and
   wherein the means for detecting translation of the mass comprises means for detecting bending stress in the inner spring members during acceleration of the accelerometer in a direction perpendicular to the plane of the inner spring members.

9. An accelerometer according to claim 8, wherein the means for determining bending stress on the inner spring members comprises two piezoresistors on each of the inner spring members, one at each end of each spring member.

10. An accelerometer according to claim 7, wherein the inner spring members and the outer spring members are oriented at substantially 45° to one another.

11. An accelerometer according to claim 7, wherein the inner mass is supported by two pairs of inner spring members, arranged such that each pair is perpendicular to the other, and both pairs of inner spring members and the axis of the outer spring members are coplanar.

12. An accelerometer according to claim 8, wherein the means for determining bending stress on the inner spring members comprises a piezoresistor at one end of each inner spring member.

13. An accelerometer according to claim 8, wherein the means for determining the bending stress on the inner spring members is positioned either on one or both of the pairs of inner spring members adjacent to the inner mass or outer mass.

14. An accelerometer according to claim 8, wherein the means for determining the torsion stress comprises a Wheatstone bridge formed from four piezoresistors, each of the piezoresistors arranged on the outer spring member or members substantially along a single direction.

15. An accelerometer according to claim 7, wherein one of the outer spring members is longer than the other.

16. An accelerometer according to claim 8, wherein the means of detecting bending and torsional stress is piezoelectric.

17. An accelerometer according to claim 1, further comprising a third means of independently detecting rotational and translation movements by capacitive detection.

18. An accelerometer comprising:
   a housing including a mass-supporting frame;
   a mass supported on the frame;
   support means for supporting the mass on the frame;
   means for detecting rotation of the mass with respect to the support means;
   means for detecting translation of the mass with respect to the support means; and
   an upper casing separated from the mass by a gap, wherein a fluid or gas is located in the gap between the casing and the upper mass to provide mechanical damping, wherein the mechanical damping is controlled by forming a recess in the upper surface of the mass.

19. An accelerometer comprising:

a housing including a frame;

a mass supported on the frame, wherein the mass includes a first section supported on the frame for rotational movement about a first axis, and a second section supported on the first section for movement along a second axis, the second axis being substantially perdendicular to the first axis;

means for detecting rotation of the mass about the first axis; and means for detecting movement of the mass along the second axis.

20. The accelerometer of claim 19, wherein the first section of the mass is supported on the frame by a pair of first support members that extend between the frame and the first section of the mass along the first axis.

21. The accelerometer of claim 20, wherein the second section of the mass is supported on the first section via second support members arranged in a plane that includes the first axis, wherein each second support member extends between the first and second sections of the mass.

22. The accelerometer of claim 19, wherein the first section of the mass defines an open area within which the second section of the mass is located.

23. The accelerometer of claim 20, wherein the mass defines a center of gravity that is offset from the first axis in the direction of the second axis, such that a force applied to the accelerometer along a third axis perpendicular to the first and second axes causes the mass to rotate about the first axis.

* * * * *